United States Patent
Mukasa

[11] Patent Number: 6,084,993
[45] Date of Patent: Jul. 4, 2000

[54] OPTICAL TRANSMISSION LINK FOR DIVISION MULTIPLEX TRANSMISSION, AND OPTICAL FIBER CONSTITUTING THE LINK

[75] Inventor: Kazunori Mukasa, Ichihara, Japan

[73] Assignee: The Furukawa Electric Co., Ltd., Tokyo, Japan

[21] Appl. No.: 09/150,016

[22] Filed: Sep. 9, 1998

[30] Foreign Application Priority Data

Sep. 10, 1997 [JP] Japan .................................... 9-262803

[51] Int. Cl.$^7$ ....................................................... G02B 6/26
[52] U.S. Cl. ............................................. 385/24; 385/122
[58] Field of Search ............................... 385/24, 123, 122

[56] References Cited

U.S. PATENT DOCUMENTS

| | | | |
|---|---|---|---|
| 5,392,377 | 2/1995 | Auracher | 385/24 |
| 5,559,910 | 9/1996 | Taga et al. | 385/24 |
| 5,649,044 | 7/1997 | Bhagavatula | 385/124 |
| 5,937,116 | 8/1999 | Seto | 385/24 |
| 5,956,440 | 9/1999 | Mikami et al. | 385/24 |
| 6,021,235 | 2/2000 | Yamamoto et al. | 385/24 |

*Primary Examiner*—Hung N. Ngo
*Attorney, Agent, or Firm*—Lacasse & Associates; Randy W. Lacasse; Kevin E. Greene

[57] ABSTRACT

The invention is to provide an optical transmission link suitable for a high speed and high bit rate wavelength division multiplex transmission. An optical transmission link 1 is composed of a non-linearity diminishing optical fiber $F_1$, a dispersion adjusted transmission optical fiber $F_2$, and an optical fiber $F_3$ for diminishing and adjusting a dispersion slope. The mode field diameter of the non-linearity diminishing optical fiber $F_1$ is made into 12 m or more. The dispersion slope is made small to be nearly zero with the mode field diameter of the dispersion adjusted transmission optical fiber $F_2$ set to 10 m or more, and the dispersion produced at the non-linearity diminishing optical fiber $F_3$ is adjusted to be small. At the optical fiber $F_3$ for diminishing and adjusting a dispersion slope, the dispersion slope of the entire optical transmission link 1 is adjusted to nearly zero. The refractive index profile of the fibers F1 and F2 is made into a segment type, and the refractive index profile of the optical fiber F3 for diminishing and adjusting a dispersion slope is made W-shaped. The absolute value of dispersion at any point position in the lengthwise direction of the optical transmission link 1 is made greater than 0.5 ps/nm/km, thereby suppressing the generation of four-wavelength mixture.

7 Claims, 2 Drawing Sheets

OPTICAL TRANSMISSION LINK FOR DIVISION MULTIPLEX TRANSMISSION, AND OPTICAL FIBER CONSTITUTING THE LINK

FIELD OF THE INVENTION

The present invention relates to an optical transmission link suitable for zero-dispersion wavelength division multiplex (WDM) transmission especially at a wavelength band of 1.55 μm, and an optical fiber which constitutes the link.

BACKGROUND OF THE INVENTION

Communication information has been remarkably increased in line with the development of the information society. In line with an increase in information, the wavelength division multiplex (WDM) transmission has been widely employed in the field of optical transmission, and the age of wavelength division multiplex transmission has arrived. A wavelength division multiplex transmission is a system is able to transmit a plurality of optical signals each having a of different wavelength on a single optical waveguide. Such a WDM system is an optical transmission system suitable for high bit rate and high speed communications.

However, when communication is carried out with a plurality of wavelength multiplexed optical signals, a non-linear phenomenon occurs. The non-linear phenomenon brings a waveform distortion to optical signals which are transmitted, and becomes a concern in high speed and high bit rate WDM optical transmissions.

As a study in solving this non-linear phenomenon, in a report of C-176, etc. in the Autumn Convention of Electronic Information Communication Society in 1996, it is reported that this non-linear phenomenon is suppressed by limiting the non-linear refraction index $n_2$. Furthermore, as a means for suppressing the non-linear phenomenon, it noted that the mode field diameter (MFD) of dispersion shifted optical fibers is increased. For example, Japanese laid-open patent publication No. 30106 of 1996 discloses that a mode field diameter of 10 μm or more is achieved in dispersion shifted optical fibers which has a segment type refraction index distribution.

OBJECTS AND SUMMARY OF THE INVENTION

However, since the dispersion slope becomes large if the mode field diameter is increased, a dispersion difference arises between the respective wavelengths if wavelength division multiplex transmission is carried out. Therefore, the transmission quality of optical signals is lowered, and a problem arises, which is an obstacle in performing high speed and high bit rate optical transmission.

On the other hand, in order to achieve flatness of the dispersion slope at approximately a wavelength band of 1.55 μm, studies have actively been carried out, which pertain to the optimal structure of dispersion compensating optical fibers to be connected to a 1.31 μm zero dispersion typical single mode optical fiber having zero dispersion at a wavelength of 1.31 μm. For example, Japanese laid-open patent publication No. 136758 of 1996 discloses information regarding the optical design of dispersion compensating optical fibers in which compensation of dispersion and dispersion slope has been taken into consideration. Actually however, since the dispersion compensating optical fibers generally have high non-linearity, wavelength distortions resulting from the non-linearity becomes a problem.

Recently, optical amplifiers in which erbium doped optical fibers are employed to amplify signals in optical transmission are used. Since the gain band of the optical amplifiers is a wavelength band of 1.55 μm, an age of high speed and high bit rate transmission at approximately a wavelength band of 1.55 μm has started, and a great task is to achieve low non-linearity of wavelength division multiplex transmission lines in this wavelength band. Therefore, this has been in a process of study. However, at this moment, any optical transmission line which achieves low non-linearity and has a small and flat dispersion slope is not achieved, that is, wherein if the non-linearity is lowered, the dispersion slope is increased, and contrarily if the dispersion slope is lowered, the non-linearity increases.

The present invention was developed in order to solve the abovementioned problems, and it is therefore an object of the invention to provide an optical transmission link suitable for a zero dispersion wavelength division multiplex transmission at a wavelength band of 1.55 μm with low non-linearity achieved regardless of making the dispersion slope small and flat especially at a wavelength band of 1.55 μm, and an optical fiber which constitutes the link.

In order to achieve the abovementioned objects, the invention is provided with the following means. That is, the first aspect of the invention relates to an optical transmission link for wavelength division multiplex transmission and is constructed so that a non-linearity diminishing optical fiber, which has a greater mode field diameter than the mode field diameter of a dispersion adjusted transmission optical fiber and diminishes the non-linearity of signal transmission, is connected before the dispersion adjusted transmission optical fiber for which the dispersion at its used wavelength band is adjusted to be small, and an optical fiber for diminishing and adjusting a dispersion slope, which is to diminish the mean dispersion slope of the entire optical fiber connection lines is connected after the abovementioned dispersion adjusted transmission optical fiber, thereby solving the problem.

The second aspect of the invention is constructed, in addition to the first aspect of the invention, so that the dispersion value of the entire optical fiber connection line at a wavelength of 1.55 μm is adjusted to be in a range of −0.1 ps/nm/km<σ<0.1 ps/nm/km, and the positive or negative dispersion value inherent to optical fibers at all the point positions in the lengthwise direction of the optical fiber connection line is 0.5 ps/nm/km or more in terms of the absolute value thereof, thereby solving the problem.

Furthermore, the third aspect of the invention is constructed, in addition to the first or second aspect of the invention, so that dispersion adjusted transmission optical fibers have a negative micro dispersion of about 0.5 through −0.3 ps/nm/km and a mode field diameter of about 10 μm or more, the mode field diameter of non-linearity diminishing optical fibers is set to about 12 μm or more, optical fibers for diminishing and adjusting a dispersion slope are composed of dispersion slope compensated optical fibers having a negative dispersion slope at a wavelength of 1.55 μm, and the dispersion slope of the entire optical fiber connection line at a wavelength of 1.55 μm is adjusted to almost zero, thereby solving the problem.

Furthermore, the fourth aspect of the invention is constructed, in addition to the abovementioned first or second aspect of the invention, so that dispersion adjusted transmission optical fibers have a negative micro dispersion of about −0.5 through −0.3 ps/nm/km and a mode field diameter of about 10 μm or more, the mode field diameter of non-linearity diminishing optical fibers is set to about 12 μm or more, optical fibers for diminishing and adjusting a dispersion slope are composed of dispersion flat optical fibers having almost zero dispersion slope at a wavelength of 1.55 μm, and the mean dispersion slope of the entire optical fiber connection line at a wavelength of 1.55 μm is adjusted to 0.08 ps/nm²/km or less, thereby solving the problem.

Furthermore, the fifth aspect of the invention is a non-linearity diminishing optical fiber used for an optical transmission link for wavelength division multiplex transmission as set forth in any one of the first through the fourth aspects of the invention, wherein the abovementioned optical fiber has a center core; a first side core, having a smaller silica level refraction index than that of the abovementioned center core, disposed so as to enclose the periphery of the abovementioned center core; a germanium doped second side core, having a greater refraction index than that of the abovementioned first side core and having a smaller refractive index than that of the center core, disposed so as to enclose the periphery of the abovementioned first side core; and a cladding having a silica level refractive index, disposed so as to enclose the periphery of the abovementioned second side core; and wherein the abovementioned optical fiber provides a segment core type refractive index distribution profile in which the constant expressing a shape of the refractive distribution has a value in a range from 1.7 through 2.5; the relative refractive index difference Δ+ with respect to the silica level of the abovementioned center core is set to a range from 0.9 through 1.2%, the relative refractive index difference Δseg with respect to the silica level of the second side core is set in a range from 0.15 through 0.35%, the ratio a2/a1 of the diameter a2 of the first side core with respect to the diameter a1 of the center core is set to a range from 2.0 through 2.8, the ratio a3/a1 of the diameter a3 of the second side core with respect to the diameter a1 of the center core is set in a range from 2.6 through 3.4; a dispersion value at a wavelength of 1.55 μm is set in a range from 8 ps/nm/km<σ<15 ps/nm/km; the dispersion slope at a wavelength of 1.55 μm is set to 0.09 ps/nm²/km or less; and the mode field diameter at a wavelength of 1.55 μm is set to 12 μm or more, thereby solving the problem.

Furthermore, the sixth aspect of the invention is a dispersion adjusted transmission optical fiber used for an optical transmission link for wavelength division multiplex transmission as set forth in any one of the first through the fourth aspects of the invention, wherein the abovementioned optical fiber has a center core; a first side core, having a smaller silica level refraction index than that of the abovementioned center core, disposed so as to enclose the periphery of the abovementioned center core; a germanium doped second side core, having a greater refraction index than that of the abovementioned first side core and having a smaller refractive index than that of the center core, disposed so as to enclose the periphery of the abovementioned first side core; and a cladding having a silica level refractive index, disposed so as to enclose the periphery of the abovementioned second side core; and wherein the abovementioned optical fiber provides a segment core type refractive index distribution profile in which the constant a expressing a shape of the refractive distribution has a value in a range from 3.0 through 3.8; the relative refractive index difference $\Delta_+$ with respect to the silica level of the abovementioned center core is set to a range from 1.1 through 1.5%, the relative refractive index difference Δseg with respect to the silica level of the second side core is set in a range from 0.23 through 0.46%, the ratio a2/a1 of the diameter a2 of the first side core with respect to the diameter a1 of the center core is set in a range from 1.8 through 2.7, the ratio a3/a1 of the diameter a3 of the second side core with respect to the diameter a1 of the center core is set in a range from 2.5 through 3.3; a dispersion value a at a wavelength of 1.55 μm is set in a range of −3.5 ps/nm/km<σ<−0.5 ps/nm/km; the dispersion slope at a wavelength of 1.55 μm is set to 0.120 ps/nm²/km or less; and the mode field diameter at a wavelength of 1.55 μm is set to 10 μm or more, thereby solving the problem.

In the invention constructed as described above, since in the non-linearity diminishing optical fiber the mode field diameter is set to be large although optical transmission signals are incident from the optical fiber side for diminishing the non-linearity of optical transmission links, optical signals are propagated to the next dispersion adjusted transmission optical fibers without producing any non-linearity even though the optical intensity of incident light is high.

The dispersion adjusted transmission optical fiber adjusts the dispersion of optical signals, which are transmitted, to a small value. And the optical signals, the dispersion of which is adjusted to be small, is made incident into the next optical fiber for diminishing and adjusting a dispersion slope, wherein the dispersion slope is diminished and adjusted to almost zero (including zero), and the optical signals are caused to outgo from the termination end of the optical fiber for diminishing and adjusting a dispersion slope.

With this invention, as described above, by optical signals having a high light intensity, which first comes in, being caused to pass through a non-linearity diminishing optical fiber, generation of a non-linearity phenomenon is suppressed. Generation of the non-linear phenomenon is subsequently suppressed when the optical signals pass through the next dispersion adjusted transmission optical fiber and the dispersion thereof is adjusted to be small. Further, the dispersion slope thereof is adjusted to almost zero by the optical signals passing through the final optical fiber for diminishing and adjusting the dispersion slope. Thereby, light which is caused to outgo from an optical transmission link according to the invention is prevented from generating a non-linear phenomenon, and it becomes a zero-dispersion signal, the dispersion slope of which is flattened to almost zero (including zero), wherein an ideal optical transmission line for carrying out a wavelength division multiplexed high speed and high bit rate optical transmission can be constructed.

As described above, since in the present invention an optical transmission link is constructed of an optical transmission line in which a non-linearity diminishing optical fiber, a dispersion adjusted transmission optical fiber and an optical fiber for diminishing and adjusting a dispersion slope are connected in sequence, it is possible to provide an optical transmission link for wavelength division multiplexed transmission by which the non-linear phenomenon can be diminished and suppressed with regard to optical signals of wavelength division multiplex transmission at a used wavelength band and high quality transmission can be carried out with both the dispersion and the dispersion slope made small.

In particular, since the used wavelength is made into 1.55 μm and the dispersion value of the entire optical fiber connection line at the wavelength of 1.55 μm is adjusted to be in a range from −0.1 ps/nm/km <σ<0.1 ps/nm/km, optical transmission of small dispersion is enabled, and since the positive or negative dispersion value inherent to fibers at any point position in the lengthwise direction of an optical fiber connection line is 0.5 ps/nm/km as the absolute value, it is possible to effectively suppress generation of a four-wavelength mixture which may be produced when a dispersion value is propagated through an optical fiber portion, the dispersion value of which is zero. Furthermore, since the mean mode field diameter of the entire optical fiber connection line is adjusted to 10 μm or more, it is possible to sufficiently increase a suppressing effect of a generation of the non-linearity of optical signals.

Still furthermore, since the refractive index structure of a non-linearity diminishing optical fiber is constructed as set forth in claim 5, the refractive index structure of a dispersion adjusted transmission optical fiber is constructed as set forth in claim 6, and an optical fiber for diminishing and adjusting the dispersion slope is caused to have a W-shaped refractive index profile and is constructed of a dispersion flat optical fiber in which the mean dispersion slope of the entire optical fiber connection line is adjusted to 0.08 ps/nm$^2$/km or less at a wavelength of 1.55 μm or is constructed of a dispersion slope compensated optical fiber in which the dispersion slope of the entire optical connection line is adjusted to almost zero at a wavelength of 1.55 μm, the non-linear phenomenon of optical signals of wavelength division multiplexed transmission at a wavelength band of 1.55 μm, which is propagated through an optical transmission link can be effectively diminished and suppressed, and the optical signals can be caused to outgo with the dispersion and dispersion slope adjusted to almost zero (including zero). Furthermore, in view of carrying out wavelength division multiplex transmission, it is possible to provide an ideal optical transmission link and optical fibers which construct the link with no four-wavelength mixture generated. Therefore, the quality and reliability of high speed and high bit rate wavelength division multiplexed transmission can be remarkably increased, and it is possible to sufficiently meet high speed and high bit rate wavelength division multiplexed transmission of the next generation.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION OF THE PREFERRED EMBODIMENT

Figure 1:
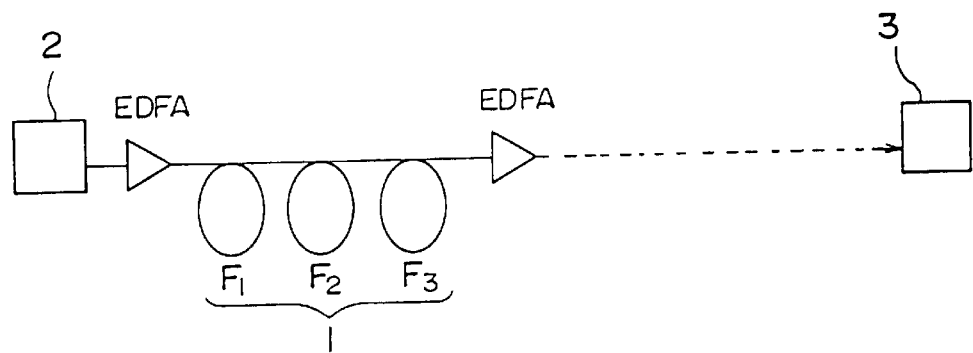
FIG. 1 is a view explaining a preferred embodiment of an optical transmission link according to the invention in a state where it is installed between a transmission station 2 and a receiving station 3.

Hereinafter, a description is given of a preferred embodiment of the invention with reference to the accompanying drawings. FIG. 1 shows one preferred embodiment of an optical transmission link for wavelength division multiplex transmission according to the invention. The optical transmission link 1 according to the preferred embodiment is such that a non-linearity diminishing optical fiber $F_1$, a dispersion adjusted transmission optical fiber $F_2$ and an optical fiber $F_3$ for diminishing and adjusting a dispersion slope are connected in a series one after another from the incident side toward the outgoing side. The optical transmission link 1 is such that it is installed between the transmission station 2 and receiving station 3 via an optical amplifier EDFA using an erbium doped optical fiber.

The non-linearity diminishing optical fiber $F_1$ of the optical transmission link 1 has a comparatively great positive dispersion and a great MFD and has a feature for diminishing the non-linearity of optical signals incident from the transmission station 2 through the EDFA.

The dispersion adjusted transmission optical fiber $F_2$ has a small negative dispersion and has a feature for diminishing and adjusting the positive dispersion produced at the above-mentioned optical fiber $F_1$ for diminishing the non-linearity while suppressing generation of the non-linearity. Furthermore, an optical fiber $F_3$ for diminishing and adjusting a dispersion slope has a feature for adjusting the dispersion slope so that the dispersion slope becomes almost zero (including zero) at the output end.

An optical transmission link 1 according to the present preferred embodiment is provided with a structure best suitable for wavelength division multiplex transmission at a wavelength band of 1.55 μm, wherein the dispersion value of the entire optical transmission link 1 is set in a range from −0.1 ps/nm/km <σ<0.1 ps/nm/km. Furthermore, the positive or negative dispersion value inherent to a fiber at any point position in the lengthwise direction of the optical transmission link 1 composed by connecting the optical fibers $F_1$, $F_2$ and $F_3$ is set to 0.5 ps/nm/km or more as the absolute value. Still furthermore, the mean mode field diameter of the entire optical fiber connection line, that is, the mean mode field diameter of the optical transmission link 1 is adjusted to 10 μm or more.

Figure 2:
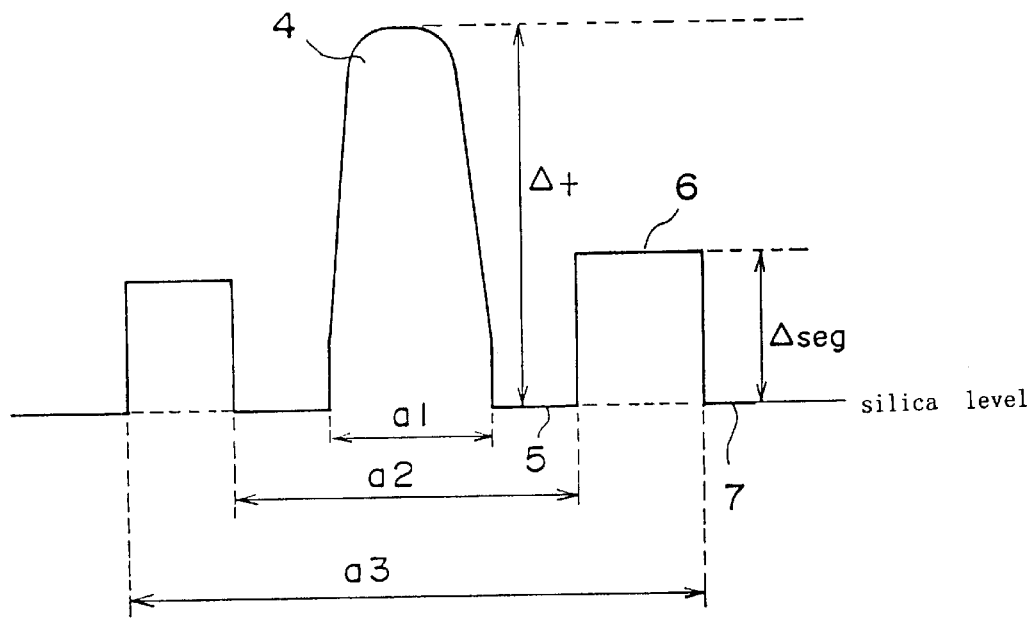
FIG. 2 is a view showing a profile of the refractive index of a non-linearity diminishing optical fiber and a dispersion adjusted transmission optical fiber, which constitute an optical transmission link 1 according to the invention.
Figure 3:
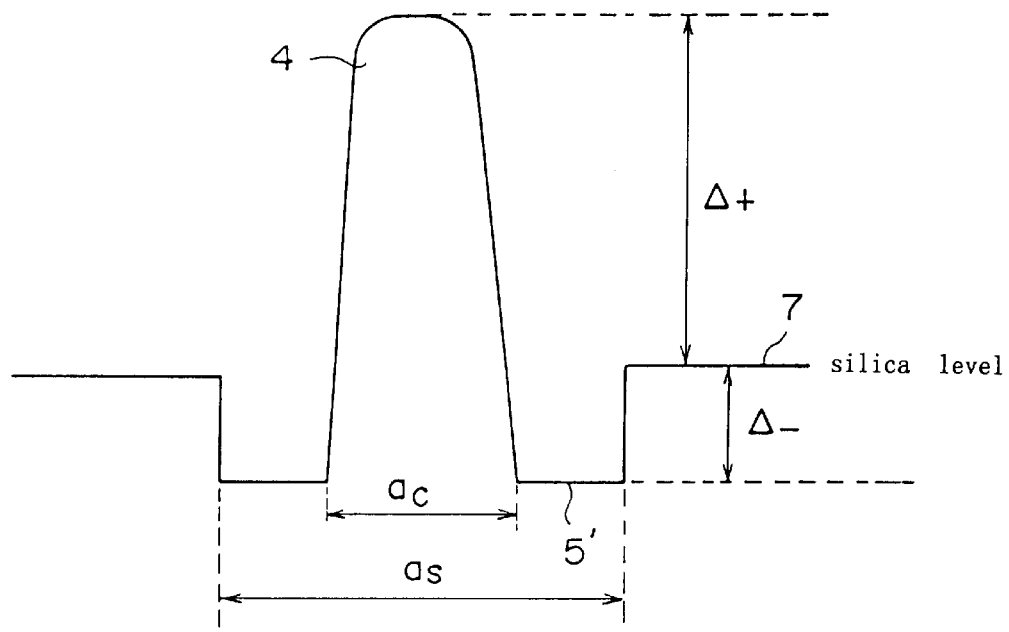
FIG. 3 is a view showing a profile of the refractive index of an optical fiber for diminishing and adjusting a dispersion slope, which constitutes an optical transmission link according to the invention.

The abovementioned non-linearity diminishing optical fiber $F_1$ and dispersion adjusted transmission optical fiber $F_2$ provide a segment core type refractive index profile as shown in FIG. 2, and the optical fiber $F_3$ for diminishing and adjusting the dispersion slope has a W-shaped refractive index profile as shown in FIG. 3.

The structure of the segment core type profile shown in FIG. 2 is as follows; That is, the first side core 5 having a silica level refractive index is formed so as to enclose the periphery of the center core 4, the second side core 6 is provided outside the first side core 5 so as to enclose the periphery of the first side core 5 and a cladding 7 having a silica level refractive index is disposed outside the second side core 6 so as to enclose the periphery of the second side core 6. The center core 4 and second side core 6 are such that germanium Ge is doped on a material whose matrix is silica, and their refractive index is made higher than the silica level of the first side core 5 and cladding 7. By increasing the amount of doping germanium of the center core 4 more than that of the second side core 6, the refractive index of the center core 4 is formed higher than the refractive index of the second side core 6. Furthermore, in FIG. 2, a1 indicates the diameter of the center core 4, a2 indicates the diameter of the first side core 5, and a3 indicates the diameter of the second side core 6.

Furthermore, an optical fiber having a W-shaped refractive index profile structure shown in FIG. 3 is such that the first side core 5 is formed outside the center core 4 so as to enclose the periphery of the abovementioned center core 4 and a cladding 7 having a silica level refractive index is disposed outside the first side core 5.

In the W-shaped refractive index profile, the center core 4 is formed to have a higher refractive index than that of the cladding 7 by doping germanium onto a material, the matrix of which is silica. Furthermore, the first side core 5 is formed to have a lower refractive index than that of the silica level cladding 7 by doping fluorine F onto a material, the matrix of which is silica.

In the specification, in the profile shown in FIG. 2, where it is assumed that the refractive index of silica level is $n_L$, the refractive index of the second side core 6 is $n_S$, and the refractive index of the center core 1 is $n_C$, the relative refractive index difference Δ+ of the center core 1 with respect to the silica level is defined by the following equation (1):

$$\Delta + = \{(n_C^2 - n_L^2)/2n_C^2\} \times 100 \quad (1)$$

Furthermore, the relative refractive index difference Δseg of the second side core 6 with respect to the silica level is defined by the following equation (2):

$$\Delta seg = \{(n_S^2 - n_L^2)/2n_S^2\} \times 100 \quad (2)$$

Next, a description is given of the structure of the respective optical fibers which constitute the optical transmission link 1 in the present preferred embodiment. An optical fiber $F_1$ for diminishing the non-linearity which is disposed at the incident side of the optical transmission link 1 is formed so as to achieve a diminishing of the non-linearity of optical transmission. Generally, a distortion $\phi_{nL}$ due to the non-linear phenomenon of optical signals is defined by the following equation (3):

$$\phi_{nL} = (2\pi \times n2 \times L_{eff} \times P)/(\lambda A_{eff}) \quad (3)$$

In this equation (3), $n_2$ is a non-linearity refractive index, $L_{eff}$ is an effective length of an optical fiber, P is input power, λ is a wavelength, and $A_{eff}$ is an effective cross-sectional area of the core of an optical fiber.

As has been made clear from the abovementioned equation (3), it is possible to decrease the distortion $\phi_{nL}$ of signals due to the non-linear phenomenon by increasing the effective cross-sectional area $A_{eff}$ of the core. Since the effective cross-sectional area $A_{eff}$ of the core is expressed by an equation $A_{eff} = K \times (MFD)^2$ where the coefficient is K, it is understood that a low non-linearity can be achieved by increasing the mode field diameter (MFD).

However, the dispersion slope will be increased by merely increasing the mode field diameter (MFD), and the optical fiber will not be practical as an optical line for wavelength division multiplex transmission. Therefore, the inventor attempted to research the conditions of a practical optical fiber $F_1$ for diminishing the non-linearity as an optical fiber $F_1$ for diminishing the non-linearity, wherein the structure of a dispersion shifted optical fiber having a segment core type refractive index profile shown in FIG. 2 is used as the basic structure. That is, the present inventor carried out simulations in which the refractive index of the center core 4 and second side core 6 and the constant a which defines the profile of the refractive index are changed, and furthermore the ratios of the diameter a1 of the center 4, diameter a2 of the first side core 5, and the diameter a3 of the second side core 6 are variously changed. On the basis of the simulations, the inventor determined the conditions by which the mode field diameter is made 12 μm or more which is able to sufficiently diminish the non-linear phenomenon and the dispersion slope can be made sufficiently small to be 0.1 ps/nm²/km or less at a wavelength of 1.55 μm. When determining these conditions, since it is understood that it is difficult to decrease both the dispersion slope and dispersion at the same time when the mode field diameter is increased, in this preferred embodiment, the inventor determined the conditions by which, in a state that the dispersion is made positive and great with the dispersion sacrificed, the mode field diameter can be increased and the dispersion slope can be sufficiently made small.

As a result, the structure of an optical fiber $F_1$ for diminishing the non-linearity is researched as follows; that is, it is satisfactory that the constant a is from 1.7 through 2.5, the relative refractive index difference Δ+ of the center core 4 with respect to the silica level is 0.9 through 1.2%, the relative refractive index difference Δseg of the second side core 6 with respect to the silica level is 0.15 through 0.35%, the ratio a2/a1 of the diameter a2 of the first side core 5 with respect to the diameter a1 of the center core 4 is from 2.0 through 2.8, and the ratio a3/a1 of the diameter a3 of the second side core 6 with respect to the diameter a1 of the center core 4 is from 2.6 through 3.4. Under these conditions, the dispersion value a becomes 8 ps/nm/km<σ<15 ps/nm/km, wherein although the dispersion is comparatively great on the positive side, it is possible to set the dispersion slope at a wavelength band of 1.55 μm to 0.09 ps/nm²/km or less.

As described above, since the optical fiber $F_1$ for diminishing the non-linearity has a comparatively great dispersion value at the positive side with the dispersion sacrificed, it is necessary that the abovementioned dispersion adjusted optical fiber $F_2$ which is connected to the optical fiber $F_1$ for diminishing the non-linearity is adjusted so as to diminish the dispersion thereof, and it is caused to have a refractive index profile by which generation of the non-linearity is suppressed.

Therefore, the inventor carried out a research on the refractive index profile of a dispersion adjusted transmission optical fiber $F_2$, which meets these conditions, by simulations. When researching, first, at the standpoint of diminishing and adjusting the positive dispersion of the abovementioned optical fiber $F_1$ for diminishing the non-linearity, the conditions by which the optical fiber has a negative micro dispersion at a wavelength of 1.55 μm, a dispersion slope of 0.12 ps/nm²/km or less and a mode field diameter of 10 μm were researched. In detail, as in the case where the abovementioned optical fiber $F_1$ for diminishing the non-linearity, a range of various conditions in which the mode field diameter becomes almost 10 μm was obtained by variously changing the refractive index of the center core 4 and the second side core 6, constant α, and ratios of the diameter a1, a2, a3, on the basis of the structure of a dispersion shifted optical fiber having a segment core type refractive index profile shown in FIG. 2.

Figure 4:
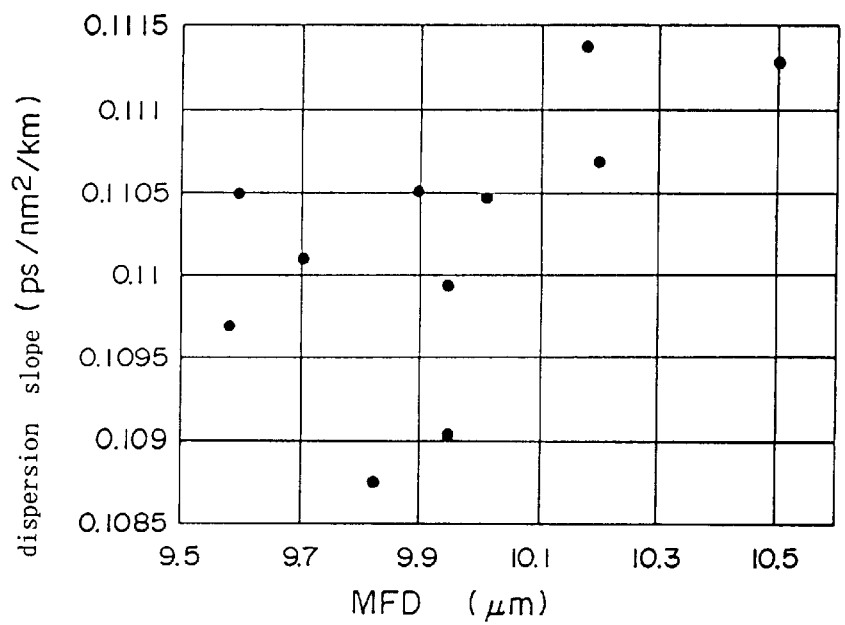
FIG. 4 is a view of a simulation showing the relationship between a mode field diameter and a dispersion slope.

FIG. 4 plots changes of the mode field diameter while changing the dispersion slope. On the basis of the relationship between the dispersion slope and the mode field diameter, a range of various conditions of a dispersion adjusted transmission optical fiber $F_2$ in which the dispersion slope is 0.12 ps/nm²/km or less and the mode field diameter becomes 10 μm were determined.

As a result, in a case where the constant a expressing the refractive index profile was set to a range from 3.0 through 3.8, the relative refractive index difference Δ+ of the center core 4 with respect to the silica level was set to a range from 1.1 through 1.5%, the relative refractive index difference Δseg of the second side core 6 with respect to the silica level was set to a range from 0.23 through 0.46%, the ratio a2/a1 of the diameter a2 of the first side core 5 with respect to the diameter a1 of the center core 4 was set to a range from 1.8 through 2.7, and the ratio a3/a1 of the diameter a3 of the second side core 6 with respect to the diameter a1 of the center core 4 was set to a range from 2.5 through 3.3, the dispersion value a became −3.5 ps/nm/km<σ<−0.5ps/nm/km at a wavelength of 1.55 μm, the dispersion slope at a wavelength of 1.55 μm is set in a range of 0.120/nm²/km, and the mode field diameter was set to a range from 10 μm to 12 μm at a wavelength of 1.55 μm.

An optical fiber $F_3$ for diminishing and adjusting a dispersion slope is constructed of a dispersion slope compensated optical fiber having a W-shaped refractive index profile or a dispersion flat optical fiber as shown in FIG. 3. In a case where the optical fiber $F_3$ for diminishing and adjusting a dispersion slope is constructed of a dispersion slope compensated optical fiber, it is constructed of an optical fiber in which the dispersion slope of the entire optical fiber transmission line, that is, the dispersion slope of the optical transmission link 1 can be adjusted to almost zero at a wavelength of 1.55 μm.

Furthermore, in a case where an optical fiber $F_3$ for diminishing and adjusting a dispersion slope is constructed of a dispersion flat optical fiber, it is constructed of an optical fiber having a refractive index profile by which the mean dispersion slope of the entire optical fiber connection line at a wavelength of 1.55 μm, that is, the mean dispersion slope of the optical transmission link 1 can be adjusted to be 0.08 ps/nm²/km or less. Furthermore, since the refractive index profiles of a dispersion slope compensated optical fiber and a dispersion flat optical fiber, which meet these conditions, have been already developed and publicly known, the detailed numerical examples of the refractive index profile are omitted.

In the preferred embodiment, as shown in FIG. 1, optical signals of wavelength division multiplex transmission are made incident from the transmission station 2 side into the optical transmission link 1 via an optical amplifier EDFA. The incident light first goes into a non-linearity diminishing optical fiber $F_1$ of the optical transmission link 1. The intensity of light of the incident signals is the strongest when first entering the optical transmission link 1, and as shown by the abovementioned equation (3), since the input light power is great, a non-linear phenomenon is inclined to occur. However, since the non-linearity diminishing optical fiber $F_1$ into which the incident light first goes has a great mode field diameter which is 12 μm or more (in the preferred embodiment, 12 μm), an effect of diminishing and suppressing the non-linear phenomenon is very high, whereby the non-linearity of optical signals is diminished and suppressed, and the signals are caused to propagate through the non-linearity diminishing optical fiber $F_1$. Furthermore, optical signals which propagate through the non-linearity diminishing optical fiber $F_1$ are caused to have a positive dispersion with the dispersion sacrificed and the dispersion slope is set to be small, the dispersion is made great at the positive side while the dispersion slope is small. Therefore, the optical signals are caused to enter the next dispersion adjusted transmission optical fiber $F_2$ in a state where the dispersion difference of the respective wavelengths of wavelength division multiplex transmission is suppressed to be low.

Although the dispersion adjusted transmission optical fiber $F_2$ has a smaller mode field diameter than that of the abovementioned non-linearity diminishing optical fiber $F_1$, the mode field diameter is large, which is more than 10 m (in the preferred embodiment, 10 μm), and since the light intensity is made weak as optical signals propagate through the abovementioned non-linearity diminishing optical fiber $F_1$. Therefore, generation of the non-linear phenomenon is suppressed as well.

Since the dispersion adjusted transmission optical fiber $F_1$ has a negative dispersion, a comparatively large positive dispersion produced at the output end of the abovementioned non-linearity diminishing optical fiber $F_1$ is diminished in the process that optical signals propagate through the dispersion adjusted transmission optical fiber $F_2$, and the dispersion is adjusted so that it is made small.

Next, optical signals enter an optical fiber $F_3$ for diminishing and adjusting a dispersion slope. The mode field diameter of the optical fiber $F_3$ for diminishing and adjusting a dispersion slope is smaller than the mode field diameter of the abovementioned non-linearity diminishing optical fiber $F_1$ and dispersion adjusted transmission optical fiber $F_2$, wherein the non-linearity constant is made great. However, since the light intensity is decreased, the non-linear phenomenon will hardly occur. For this reason, optical signals of wavelength division multiplex transmission will be propagated through the entire optical transmission link 1 in a state where the non-linear phenomenon is diminished and adjusted. Furthermore, since in the optical fiber $F_3$ for diminishing and adjusting the dispersion and the dispersion slope between the respective wavelengths of a transmission wavelength band is adjusted to almost zero (including zero), no non-linear phenomenon occurs at the output end of the optical transmission link 1, and optical signals of wavelength division multiplex transmission, the dispersion and dispersion slope of which are adjusted to almost zero (including zero), are caused to outgo.

In particular, since the preferred embodiment is formed so that the dispersion value a of the entire optical transmission link 1 at a wavelength of 1.55 μm is adjusted in a range from −0.1 ps/nm/km<σ<0.1 ps/nm/km, and the positive or negative dispersion value becomes 0.5 ps/nm/km or more as its absolute value at any point position in the lengthwise direction of the optical transmission link 1, it is possible to lessen the dispersion of optical signals which are caused to propagate through the optical transmission link 1. In line therewith, since it is constructed that no portion where the dispersion value inherent to the optical fiber becomes zero occurs at each position in the lengthwise direction of the optical transmission link 1, it is possible to effectively prevent the generation of the four-wavelength mixture (FWM), which is produced when optical signals propagate through the optical fiber where the dispersion becomes zero, from occurring.

Next, a prototype of a practical non-linearity diminishing optical fiber $F_1$, practical dispersion adjusted transmission optical fiber $F_2$ and practical optical fiber $F_3$ for diminishing and adjusting a dispersion slope is described on the basis of the simulations of the abovementioned preferred embodiment. Table 1 shows the results of evaluating the characteristics of the respective optical fibers $F_1$, $F_2$, $F_3$ in compliance with the results of the prototype. Furthermore, Table 1 also shows the data of usual dispersion shifted optical fiber (Usual DSF) as controls, for easy comparison.

TABLE 1

| Fiber name | $F_1$ | $F_2$ | $F_3$ | Usual DSF |
|---|---|---|---|---|
| Profile | Segment | Segment | W-shaped | Dual-shaped |
| Core diameter [μm] | 9.9 | 10.2 | 12.5 | 15.0 |
| 1.55 dispersion value [ps/nm/km] | 10.27 | −2.80 | −4.68 | 0.223 |
| Dispersion slope [ps/nm$^2$/km] | 0.088 | 0.116 | −0.038 | 0.070 |
| 1.55 MFD[μm] | 12.2 | 10.0 | 6.85 | 7.525 |
| $n_2/A_{eff}$[e-10/w] | 2.582 | 3.819 | 7.301 | 4.15 |
| Bending loss (φ20) [dB/m] | 4.01 | 6.50 | 6.81 | 6.11 |
| Cutoff wavelength[nm] | 1250.3 | 992.6 | 840.5 | 1220.0 |
| 1.55 transmission loss [dB/km] | 0.254 | 0.249 | 0.210 | 0.223 |
| PMD[ps/rkm] | 0.089 | 0.076 | 0.056 | 0.068 |

In Table 1, the bending loss is a loss when an optical fiber is bent to a diameter of 20 mm, and PMD shows a polarized dispersion. A numeral 1.55 means a wavelength of 1.55 μm. Furthermore, as regards the data shown in Table 1, the data of a dispersion slope compensated optical fiber are indicated as data of the optical fiber $F_3$ for diminishing and adjusting a dispersion slope.

The results of evaluating the characteristics of the entire optical transmission link 1 of the prototype, which is composed of a connection of a non-linearity diminishing optical fiber $F_1$, 10 km long, a dispersion adjusted transmission optical fiber $F_2$, 23 km long, and an optical fiber $F_3$, 9 km long, for diminishing and adjusting a dispersion slope, are shown in Table 2.

TABLE 2

| 1.55 dispersion value [ps/nm/km] | −0.91 |
|---|---|
| Dispersion slope [ps/nm$^2$/km] | 0.0768 |
| Mean 1.55 transmission loss [dB/km] | 0.232 |
| Mean 1.55 PMD [ps/√km] | 0.064 |

As has been made clear from Table 2, the dispersion value of an optical transmission link 1 at a wavelength of 1.55 μm is made remarkably small to be −0.091 ps/nm/km. Furthermore, the dispersion slope which is 0.0768 ps/nm$^2$/km and is nearly zero can be obtained. Still furthermore, the mean transmission loss at a wavelength band of 1.55 μm which is 0.232 dB/km and is a small value can be obtained, and the mean polarized dispersion at a wavelength of 1.55 μm, which is 0.064 ps/√km; and is a small value, can be obtained. Since the prototype of an optical transmission link 1 has such characteristics, it is proven that the optical transmission link 1 according to the preferred embodiment is an optical link having ideal propagation characteristics in view of carrying out high speed and high bit rate wavelength division multiplex transmission.

Furthermore, since the mean mode field diameter of the entire line of an optical transmission link 1 according to the preferred embodiment is adjusted to more than 10 μm, it can be confirmed that the non-linearity of optical signals propagating through the optical transmission link 1 has been effectively diminished and suppressed.

In the abovementioned preferred embodiment, a case where a dispersion slope compensated optical fiber is used as an optical fiber $F_3$ for diminishing and adjusting a dispersion slope is shown. However, even if a dispersion flat optical fiber, in which the mean dispersion slope of the entire line of the optical transmission link 1 at a wavelength of 1.55 μm is adjusted to be less than 0.08 ps/nm$^2$/km, is used, excellent effects similar to the abovementioned case can be obtained.

What is claimed is:

1. An optical transmission link for a wavelength division multiplex transmission, wherein a non-linearity diminishing optical fiber, which has a greater mode field diameter than the mode field diameter of a dispersion adjusted transmission optical fiber and diminishes the non-linearity of signal transmission, is connected before said dispersion adjusted transmission optical fiber for which the dispersion at its used wavelength band is adjusted to be small, and an optical fiber for diminishing and adjusting a dispersion slope, which is to diminish the mean dispersion slope of the entire optical fiber connection lines is connected after said dispersion adjusted transmission optical fiber.

2. An optical transmission link for a wavelength division multiplex transmission as set forth in claim 1, wherein the dispersion value a of the entire optical fiber connection line at a wavelength of 1.55 μm is adjusted to be in a range of −0.1 ps/nm/km<σ<0.1 ps/nm/km, and the positive or negative dispersion value inherent to optical fibers at all the point positions in the lengthwise direction of the optical fiber connection line is 0.5 ps/nm/km or more in terms of the absolute value thereof.

3. An optical transmission link for a wavelength division multiplex transmission as set forth in claim 1 or 2, wherein a dispersion adjusted transmission optical fiber has a negative micro dispersion of about −0.5 through −0.3 ps/nm/km and a mode field diameter of about 10 m or more, the mode field diameter of non-linearity diminishing optical fibers is set to about 12 μm or more, optical fibers for diminishing and adjusting a dispersion slope are composed of dispersion slope compensated optical fibers having a negative dispersion slope at a wavelength of 1.55 m, and the dispersion slope of the entire optical fiber connection line at a wavelength of 1.55 μm is adjusted to almost zero.

4. An optical transmission link for a wavelength division multiplex transmission as set forth in claim 1, wherein a dispersion adjusted transmission optical fiber has a negative micro dispersion of about −0.5 through −0.3 ps/nm/km and a mode field diameter of about 10 μm or more, the mode field diameter of non-linearity diminishing optical fibers is set to about 12 μm or more, optical fibers for diminishing and adjusting a dispersion slope are composed of dispersion flat optical fibers having almost zero dispersion slope at a wavelength of 1.55 μm, and the mean dispersion slope of the entire optical fiber connection line at a wavelength of 1.55 μm is adjusted to 0.08 ps/nm$^2$/km or less.

5. An optical transmission link for a wavelength division multiplex transmission as set forth in claim 2, wherein a dispersion adjusted transmission optical fiber has a negative micro dispersion of about −0.5 through −0.3 ps/nm/km and a mode field diameter of about 10 μm or more, the mode field diameter of non-linearity diminishing optical fibers is set to about 12 μm or more, optical fibers for diminishing and adjusting a dispersion slope are composed of dispersion flat optical fibers having almost zero dispersion slope at a wavelength of 1.55 μm, and the mean dispersion slope of the entire optical fiber connection line at a wavelength of 1.55 μm is adjusted to 0.08 ps/nm$^2$/km or less.

6. A non-linearity diminishing optical fiber used for an optical transmission link for wavelength division multiplex transmission, wherein said optical fiber has a center core; a first side core, having a smaller silica level refraction index than that of said center core, disposed so as to enclose the periphery of said center core; a germanium doped second side core, having a greater refraction index than that of said first side core and having a smaller refractive index than that of the center core, disposed so as to enclose the periphery of said first side core; and a cladding having a silica level refractive index, disposed so as to enclose the periphery of said second side core; and wherein said optical fiber provides a segment core type refractive index distribution profile in which a constant a expressing a shape of the refractive distribution has a value in a range from 1.7 through 2.5; the relative refractive index difference Δ+ with respect to the silica level of said center core is set to a range from 0.9 through 1.2%, the relative refractive index difference Δseg with respect to the silica level of the second side core is set in a range from 0.15 through 0.35%, the ratio a2/a1 of the diameter a2 of the first side core with respect to the diameter a1 of the center core is set to a range from 2.0 through 2.8, the ratio a3/a1 of the diameter a3 of the second side core with respect to the diameter a1 of the center core is set in a range from 2.6 through 3.4; a dispersion value a at a wavelength of 1.55 $\mu$m is set in a range from 8 ps/nm/km<σ<15 ps/nm/km; the dispersion slope at a wavelength of 1.55 $\mu$m is set to 0.09 ps/nm$^2$/km or less; and the mode field diameter at a wavelength of 1.55 $\mu$m is set to 12 $\mu$m or more.

7. A dispersion adjusted transmission optical fiber used for an optical transmission link for wavelength division multiplex transmission, wherein said optical fiber has a center core; a first side core, having a smaller silica level refraction index than that of said center core, disposed so as to enclose the periphery of said center core; a germanium doped second side core, having a greater refraction index than that of said first side core and having a smaller refractive index than that of the center core, disposed so as to enclose the periphery of said first side core; and a cladding having a silica level refractive index, disposed so as to enclose the periphery of said second side core; and wherein said optical fiber provides a segment core type refractive index distribution profile in which the constant α expressing a shape of the refractive distribution has a value in a range from 3.0 through 3.8; the relative refractive index difference $\Delta_+$ with respect to the silica level of said center core is set to a range from 1.1 through 1.5%, the relative refractive index difference Δseg with respect to the silica level of the second side core is set in a range from 0.23 through 0.46%, the ratio a2/a1 of the diameter a2 of the first side core with respect to the diameter a1 of the center core is set in a range from 1.8 through 2.7, the ratio a3/a1 of the diameter a3 of the second side core with respect to the diameter a1 of the center core is set in a range from 2.5 through 3.3; a dispersion value σ at a wavelength of 1.55 $\mu$m is set in a range of −3.5 ps/nm/km<σ<−0.5 ps/nm/km; the dispersion slope at a wavelength of 1.55 $\mu$m is set to 0.120 ps/nm$^2$/km or less; and the mode field diameter at a wavelength of 1.55 $\mu$m is set to 10 $\mu$m or more.

* * * * *

UNITED STATES PATENT AND TRADEMARK OFFICE
CERTIFICATE OF CORRECTION

PATENT NO. : 6,084,993
DATED : July 4, 2000
INVENTOR(S) : Mukasa

It is certified that error appears in the above-identified patent and that said Letters Patent is hereby corrected as shown below:

Title should read -- OPTICAL TRANSMISSION LINK FOR WAVELENGTH DIVISION MULTIPLEX TRANSMISSION, AND OPTICAL FIBER CONSTITUTING THE LINK --.

In the abstract, lines 8 and 11, "m" should read -- μm --.

Col. 2, line 52, "0.5" should read -- -0.5 --.

Col. 3, line 62, "$\Delta_+$" should read -- $\Delta+$ --.

Col. 7:
- Lines 14 and 15, "center core 1" should read -- center core 4 --;
- Equation 3 should read $\phi_{nL}=(2\pi \times n_2 \times L_{\mathit{eff}} \times P)/(\lambda \times A_{\mathit{eff}})$;
- Line 61, "constant a" should read -- constant $\alpha$ --.

Col. 8:
- Lines 14 and 63, "constant a" should read -- constant $\alpha$ --;
- Line 24, "dispersion value a" should read -- dispersion value σ --.

Col. 9:
- Line 8, "dispersion value a" should read -- dispersion value σ --;
- Line 10, "$0.120/nm^2/km$" should read -- $0.120 ps/nm^2/km$ --.

Col. 10:
- Line 1, "10 m" should read -- 10 μm --;

UNITED STATES PATENT AND TRADEMARK OFFICE
CERTIFICATE OF CORRECTION

PATENT NO. : 6,084,993
DATED : July 4, 2000
INVENTOR(S) : Mukasa

It is certified that error appears in the above-identified patent and that said Letters Patent is hereby corrected as shown below:

Line 40, "dispersion value a" should read -- dispersion value σ --.

In Claim 2, col. 12, line 16, "dispersion value a" should read -- dispersion value σ --.

In Claim 3, col. 12:
    Line 27, "10 m" should read -- 10 μm --;
    Line 32, "1.55 m" should read -- 1.55 μm --.

In Claim 6, col. 13:
    Line 5, "constant a" should read -- constant α --;
    Line 16, "dispersion value a" should read -- dispersion value σ --.

In Claim 7, col. 14, line 11, "$\Delta_+$" should read -- Δ+ --.

Signed and Sealed this

Twenty-second Day of May, 2001

Attest:

NICHOLAS P. GODICI

*Attesting Officer*     Acting Director of the United States Patent and Trademark Office